(12) United States Patent
Bort

(10) Patent No.: US 9,531,854 B1
(45) Date of Patent: Dec. 27, 2016

(54) PLAYING LOCAL DEVICE INFORMATION OVER A TELEPHONE CONNECTION

(75) Inventor: David P. Bort, Palo Alto, CA (US)

(73) Assignee: Google Inc., Mountain View, CA (US)

(*) Notice: Subject to any disclaimer, the term of this patent is extended or adjusted under 35 U.S.C. 154(b) by 928 days.

(21) Appl. No.: 12/638,446

(22) Filed: Dec. 15, 2009

(51) Int. Cl.
H04M 1/00 (2006.01)
H04B 1/38 (2015.01)
H04M 1/27 (2006.01)

(52) U.S. Cl.
CPC .................................. H04M 1/271 (2013.01)

(58) Field of Classification Search
USPC .................. 455/3.05, 412.1, 412.3, 414.1, 414.4, 455/418, 466, 74, 74.1, 569.1, 569.2; 379/88.04, 88.13, 88.14, 88.16, 88.17, 379/93.01
See application file for complete search history.

(56) References Cited

U.S. PATENT DOCUMENTS

| | | | |
|---|---|---|---|
| 7,013,282 B2 | 3/2006 | Schrocter | |
| 7,117,152 B1 * | 10/2006 | Mukherji et al. | 704/235 |
| 7,212,617 B2 * | 5/2007 | Owens et al. | 379/93.24 |
| 7,606,352 B2 * | 10/2009 | Cass | 379/88.22 |
| 7,729,481 B2 * | 6/2010 | Thompson et al. | 379/93.01 |
| 7,990,964 B2 * | 8/2011 | O'Brien et al. | 370/392 |
| 2006/0161426 A1 | 7/2006 | Ikegami | |
| 2007/0260460 A1 | 11/2007 | Hyatt | |
| 2008/0133580 A1 | 6/2008 | Wanless et al. | |
| 2009/0156240 A1 | 6/2009 | Kirchmeier et al. | |
| 2011/0111805 A1 * | 5/2011 | Paquier et al. | 455/563 |

* cited by examiner

Primary Examiner — Tuan A Tran
(74) Attorney, Agent, or Firm — Fish & Richardson P.C.

(57) ABSTRACT

Methods, systems, and apparatus, including computer programs encoded on a computer storage medium, for playing local device information over a telephone connection. In one aspect, a method includes establishing, by a first electronic client communication device, an audio connection between the first electronic client communication device and a remote second electronic client communication device, determining that a user has selected a control of the first electronic client communication device, selecting, with a computer system and in response to determining that the user selected the control, text data that is associated with the user or the first client communication device, translating, with the computer system, the text data into a speech signal, and playing the speech signal to the remote second client device over the audio connection by electronically inserting the speech signal into the audio connection.

20 Claims, 6 Drawing Sheets

PLAYING LOCAL DEVICE INFORMATION OVER A TELEPHONE CONNECTION

BACKGROUND

This specification relates to telephony.

Within recent memory, mobile phones have evolved from a rare curiosity into a widely-available, indispensable business tool and social necessity. As with other technological advances, however, many people also view mobile phones with contempt. With the dramatic increase in the number of 'gee-whiz' functions available on today's mobile phones, for instance, users often find that they cannot quickly access simple features which would make the use of their phones more intuitive and straightforward.

SUMMARY

This specification describes techniques for generating a speech signal using user-selected information that is stored by a client device (e.g., a mobile phone or other electronic client communication device), and for playing the speech signal over an output audio channel of the client device to another party of a telephone call, over a telephone connection. Because the user-selected information is stored by the client device, it is referred to by this specification as "local information," "local device information," or "local content." When this local information is textual information, it is referred to simply as "text data."

The speech signal may be played in response to the user selecting a control on the client device. The speech signal may correspond to some or all of the information that is displayed on a user interface of the client device when the control is selected, or to other information that is generated or stored by the client device, but that is not displayed.

In one innovative aspect of the subject matter described in this specification, playing local information may include translating text data into a speech signal, and playing the speech signal. In general, a user may select a portion of text data that is available at a client device, and may instruct the text data to be output in speech form, locally and/or to the other party of a telephone call.

In general, another innovative aspect of the subject matter described in this specification may be embodied in methods that include the actions of establishing, by a first electronic client communication device, an audio connection between the first electronic client communication device and a remote second electronic client communication device, determining that a user has selected a control of the first electronic client communication device, selecting, with a computer system and in response to determining that the user selected the control, text data that is associated with the user or the first client communication device, translating, with the computer system, the text data into a speech signal, and playing the speech signal to the remote second client device over the audio connection by electronically inserting the speech signal into the audio connection. Other embodiments of this aspect include corresponding systems, apparatus, and computer programs, configured to perform the actions of the methods, encoded on computer storage devices.

These and other embodiments may each optionally include one or more of the following features. For instance, the text data may be text displayed on a user interface of the first electronic client communication device. Selecting the text data may further include identifying the user selected control from among multiple controls on the first electronic client communication device, and selecting text data that is associated with the identified control. The actions may also include modifying the text data before translating the text data, or identifying a geographic locale associated with the first electronic client communication device, and modifying the text data based on the geographic locale. The actions may also include determining an identity of a caller or a callee corresponding to the first electronic communication device, and modifying the text data based on the identity of the caller or the callee. Modifying the text data may include appending the text data or filtering the text data, or appending a calling code to the text data. The control may be a physical button, a software widget, a soft key, or a menu option. Selecting the text data may further include invoking a contact application on the first electronic client communication device, identifying a contact stored in a storage medium corresponding to the first electronic client communication device, using the contact application, and outputting contact information for the identified contact as the text data.

In other example implementations, selecting the text data may further include invoking a navigation application on the first electronic client communication device, generating navigation information using the navigation application, and outputting the navigation information as the text data. The actions may also include determining a location of the first electronic client communication device, and generating the navigation information based on the location of the first electronic client communication device. Selecting the text data may further include capturing an image using a camera of the first electronic client communication device, performing optical character recognition on the image, and outputting a result of the optical character recognition as the text data. The actions may also include muting a microphone of the first electronic client communication device while playing the speech signal over the audio connection, or muting the audio connection and playing a prerecorded audio message over a speaker of the first electronic client communication device while playing the speech signal over the audio connection. Selecting the text data may further include selecting text displayed adjacent to the user selected control on a user interface of the first electronic client communication device. The audio connection between the first electronic client communication device and the remote second electronic client communication device may be an indirect telephone connection through a network.

In general, another innovative aspect of the subject matter described in this specification may be embodied in a first electronic client communication device that includes a control and a processor configured to (a) establish an audio connection between the first electronic client communication device and a remote second electronic client communication device, (b) determine that a user has selected the control (c) select, with a computer system and in response to determining that the user selected the control, text data that is associated with the user or the first client communication device, (d) translate, with the computer system, the text data into a speech signal, and (e) playing the speech signal to the remote second client device over the audio connection by electronically inserting the speech signal into the audio connection. Other embodiments of this aspect include corresponding methods, systems, apparatus, and computer programs, configured to perform the actions implemented by the first client device.

The details of one or more embodiments are set forth in the accompanying drawings and the description below. Other potential features and advantages will be apparent from the description and drawings, and from the claims.

DESCRIPTION OF DRAWINGS

Like reference symbols in the various drawings indicate like elements.

DETAILED DESCRIPTION

Figure 1:
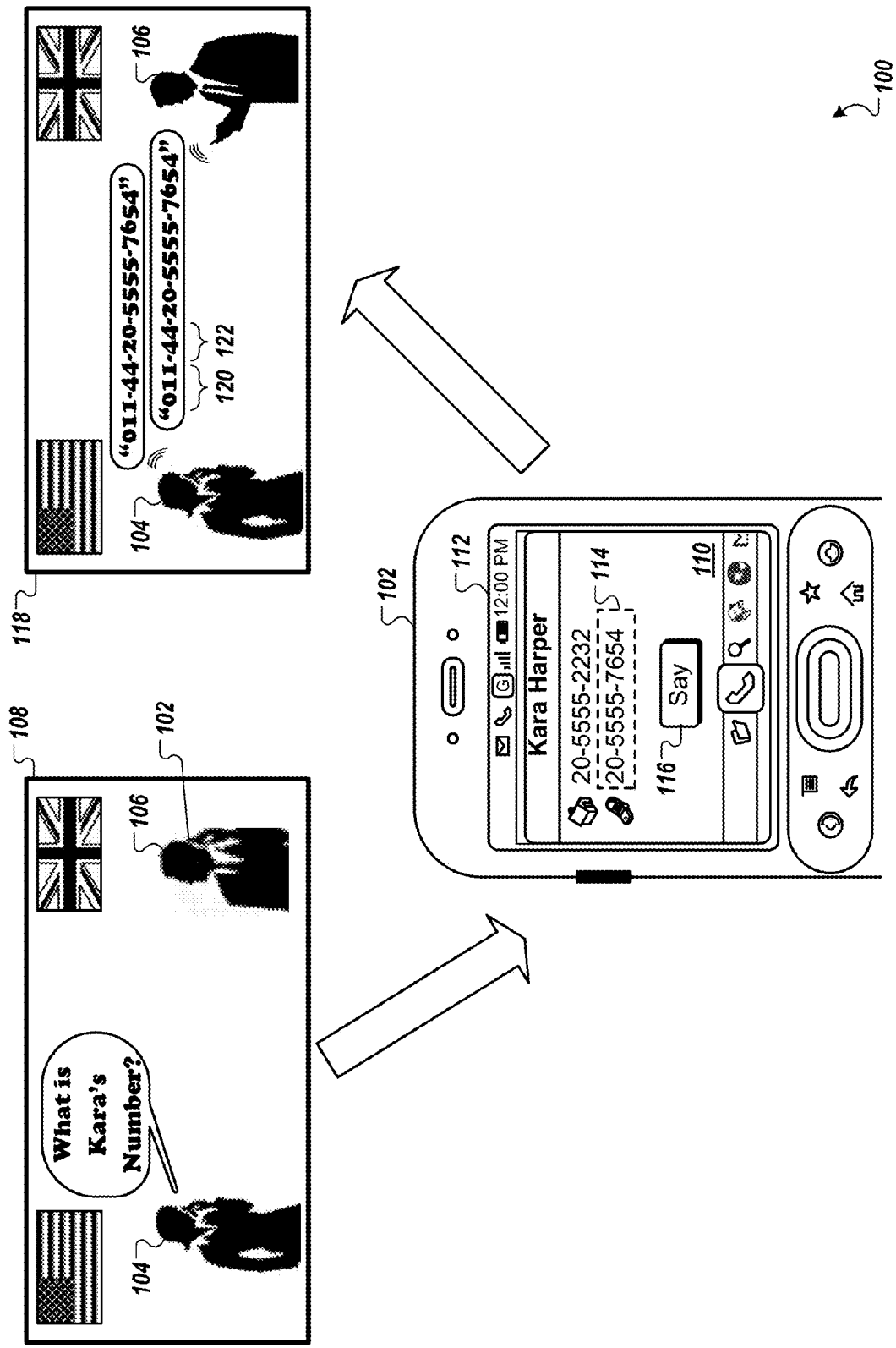
FIG. 1 is a conceptual diagram of an exemplary framework for playing local information over a telephone connection.

FIG. 1 is a conceptual diagram of an exemplary framework 100 for playing local information over a telephone connection. Client device 102, which in this example is a wireless, mobile device such as a cell phone, mobile phone, satellite phone, radio phone, smart phone, or personal digital assistant (PDA), is used to engage in telephone calls over a telephone connection, and to store information. A user may invoke certain functionality of the client device 102 by using input controls (e.g., buttons, number pad, touch screen, miniature keyboard, voice input device, or stylus).

When using the client device 102 as a telephone, the audio channels used for this functionality may include an audio stream, including an incoming audio stream and an outgoing audio stream. The audio stream may be a continuous stream, or it may be discontinuous. During a telephone call between two parties, outgoing voice, speech or other audio data detected by the microphone of the client device 102 is transmitted to the other party of the telephone call over the audio stream (specifically, the outgoing audio stream) of the client device 102. Incoming voice, speech, or other audio data from the other party of the telephone call is received over the audio stream (specifically, the incoming audio stream) of the client device 102, and is played to the user through a speaker.

During the telephone call, the parties expect that the signals that are transmitted over the output audio stream of the client device 102 will be played over the input audio stream of the remote client device of the other party. Likewise, the parties also expect that the signals played over the output audio stream of the remote client device of the other party will be received over the input audio stream of the client device 102. Either of the user of the client device 102 or the other party may be an initiator of the telephone call (referred to by this specification as the "caller"), or may be a recipient of the telephone call (referred to by this specification as the "callee").

The exemplary framework 100 illustrated in FIG. 1 depicts a telephone call between a first party 104, who is located in the United States, and a second party 106, who is located in the United Kingdom and who is using the client device 102 to conduct the telephone call. The telephone call is depicted in a first state 108 and a later, second state 118. In the first state 108, the first party 104 asks the second party 106, "What is Kara's number?"

Because most people have a limited ability to recollect long series of numbers, particularly when using a client device in a distracting environment, the second party 106 may find it awkward or inconvenient to read off text data that is displayed on the user interface of the mobile device 102. For example, when first party 104 requests the phone number, it might be difficult for the second party 106 to look up the phone number from within a contact information application, and to accurately read off the digits of a long phone number to the first party 104. The second party 106 might otherwise manually read this information, for example, two or three digits at a time, by repeatedly alternating between speaking into the client device 102 and referencing the contact information on the user interface 112.

Accordingly, the exemplary framework 100 provides an application for generating a speech signal using text data that is selected by the second party 106, and for playing speech signal over the telephone connection. The exemplary framework 100 may thus provide for the accurate and discreet transmission of personal information (e.g., address, phone number, etc.) across a telephone connection, without requiring the second party 106 to read the text data out loud, or to speak in hushed tones that may be inaudible to the first party 104.

In response to the question posed by the first party 104 in the first state 108, the second party 106 accesses contact information 110 that is related to a mutual friend, 'Kara Harper,' stored by the client device 102. The contact information 110 is one type of text data that is stored by the client device 102 as a series of digits and special characters. The contact information 110 may be displayed within a user interface 112 of the client device 102.

The contact information 110 may be accessed by the second party 106 by selecting a sequence of menu options on the client device 102. The second party 106 may also access the contact information 110 through a voice command. The client device 102 may also use various speech recognition approaches to "listen" to the conversation between the first party 104 and the second party 106 during the telephone call, and may suggest certain information to the second party 106 within the user interface 112 based upon keywords that are detected from their conversation.

Because the contact information 110 for 'Kara Harper' may include more information than just the requested telephone number, the second party 106 may select the phone number 114 as the specific text data which they intend to convey to the first party 104. The text data may be selected using a touch screen, stylus, a control, voice command, or through any other approach.

When a user selects the text data during a telephone call, the client device 102 may automatically display a control within the user interface 112. When selected by the second party 106, the control may instruct the client device 102 to play the local information over the telephone connection, by translating the text data to a speech signal, and then providing the speech signal over the output audio channel. For example, a "Say" control 116 may be automatically displayed on the user interface 112 when the phone number 114 is selected during a telephone call. When the "Say" control 116 is selected, the phone number 114 is translated from text data into a speech signal, and the speech signal may be provided audibly to the first party 104. In some implementations, the "Say" control 116 may be one option that the second party 106 may navigate to in a menu hierarchy.

In other implementations, the "Say" control 116 may appear without selecting text data, or may be one of multiple controls. For example, the user interface 112 may include a "Say All" control, a "Say Home Phone" control, a "Say Mobile Phone" control, or a "Say Address" control, where each control corresponds to a different subset of the contact information 110. For instance, the second party 106 may play a home telephone number for a contact that is currently the focus of a device by selecting a "Say Home Phone" control, or may play all displayed or all known information about an identified contact by selecting a "Say All" control. Where more than one control is used, the controls may be application-specific controls (e.g. "Say address" and "Say phone number" controls for a contact application executing on the client device 102), or the controls may be generic to all applications running on a device (e.g., "Say selected," or "Say visible" controls which may be used with any application).

The "Say" control 116, which is illustrated in FIG. 1 as a software element, is a "control," since it is a type of instrument that can be used by a user of the client device 102 to operate or instruct the client device 102. In other examples, the "Say" control 116 is another type of control, such as a physical button (e.g., keypad key, switch, etc.) or a softkey (e.g., a physical button that is engaged in tandem with a software element) that can be used to send a text-to-speech (TTS) translation of the requested telephone number to the first party 104.

When the second party 106 selects the "Say" control 116, the client device 102 generates a speech signal using identified text data, and plays the speech signal over the output audio channel of the client device 102 to the first party 104. For example, a TTS module at the client device 102 may convert the textual, phone number data to a speech signal. The speech signal corresponding to the selected text may then be played over the audio stream to the first party 104. The sound may be inserted directly and electronically into the audio stream, without passing any corresponding sound through a microphone on the client device 102.

The speech signal that is played over the output audio steam of the client device 102 may be automatically generated by an internal module (or computer system) of the client device 102, and may be played over the output audio stream by the same or a different internal module (or computer system). The generation and playing of the speech signal may be agnostic to the receipt of any corresponding sound through the microphone on the client device. For instance, the generated speech signal may not include sounds that are received through the microphone. Furthermore, the speech signal may be played regardless of whether any sound, or particular sounds, are received through the microphone. In another example, however, a voice command received through the microphone may initiate the generation and playing of the speech signal, however the voice command itself may not be played over the output audio channel.

The volume of the speech signal may be matched, by the client device 102, to the average volume of the conversation level, the music volume setting of the client device 102, or a default volume level coded into the client device 102. Although the first party 104 is illustrated as using a mobile phone, the first party 104 may instead be using a landline telephone, personal computer, or other device capable of engaging in telephone communications with the client device 102. Similarly, in other implementations, the client device 102 may not be a mobile device, such as where the client device 102 is a desktop personal computer or a landline telephone.

In addition to playing the speech signal over the output audio channel of the client device 102, it may also be played over the audio stream (e.g., through the speaker of the client device 102). In this way, the second party 106 may listen to the speech signal that is being transmitted to the first party 104. Rather than transmitting the speech signal over the audio stream of the client device 102, a predetermined audio file may be played over the incoming audio stream, or the speaker of the client device 102 may be muted. The microphone of the client device 102 may also be muted during transmission of the speech signal, so that the first party 102 may hear the speech signal more clearly.

In addition to translating the text data into a speech signal, the client device 102 may also process the text data before or after the translation, to filter out portions of the text data, to append additional data to the text data, or to modify the text data. For example, the client device 102 may identify an output language (e.g., for use in selecting a language-specific TTS module) based upon the locale or location of the client device 102, the country code of the first party 104 (e.g., determined from caller identification information or other data received with the incoming audio signal), information saved within the contact information record associated with the first party 104, or a preference setting applied by the second party 106.

In another example, the client device 102 may append a pre-recorded message to the beginning of the speech signal, such as an audio signal that states "The requested number is". As another example, if the selected text data includes an address, the client device 102 may expand abbreviations before the translation by the TTS module, such as by changing "ST" to "street," and "NY" to "New York," or the client device 102 may filter out unhelpful information, such as a zip code, in which the first party 104 may not be interested.

In the FIG. 1 example, the first party 104 is located in the United States and the second party 106 is located in the United Kingdom. Accordingly, and as depicted in the second state 118, the client device 102 may recognize the need for additional dialing digits, and may append these digits to the phone number 114. As shown, for instance, an international dialing code 120 and a country code 122 have been appended to the phone number 114 before translating the phone number 114 using the TTS module of the client device 112.

The text data may represent any appropriate type of information, including text data that is automatically derived from non-textual information. For example, the text data may be text messages, driving directions, shopping lists, restaurant descriptions, cooking recipes, and similar information. Alternatively, the text data may be derived from a camera image using optical character recognition (OCR).

In addition to using text data that is already stored at the time of the control selection, the client device 102 may translate text data which is generated in real time (e.g., upon detecting the selection of a control). For example, the client device 102 may calculate and translate current GPS coordinates, ambient temperature readings, or a description of the present location of the client device 102 (e.g., the street names of the nearest intersection or the name of the current highway and the nearest mile marker).

In addition to or instead of providing a speech signal over the outgoing audio channel, the client device 102 may also transmit a data file through the output audio channel of the client device 102, or through another data channel. For example, the speech signal may be packaged as an audio file or as part of a multimedia file (e.g., a speech version of the GPS coordinates or description of the present location of the client device 102 along with a photo of the present location as captured by a built-in camera feature of the client device 102), and transmitted over the output audio channel or a data channel to the first party 104.

In this manner, when using the framework 100, the second party 106 may automatically transmit information from the client device 102 to the first party 104 rather than having to read portions of information from the user interface 112 of the client device 102, memorize the information, recite the information through the microphone of the client device 102, and repeat until all of the desired information (e.g., the entire ten or more digits of the phone number 114) has been communicated to the first party 104.

Figure 2:
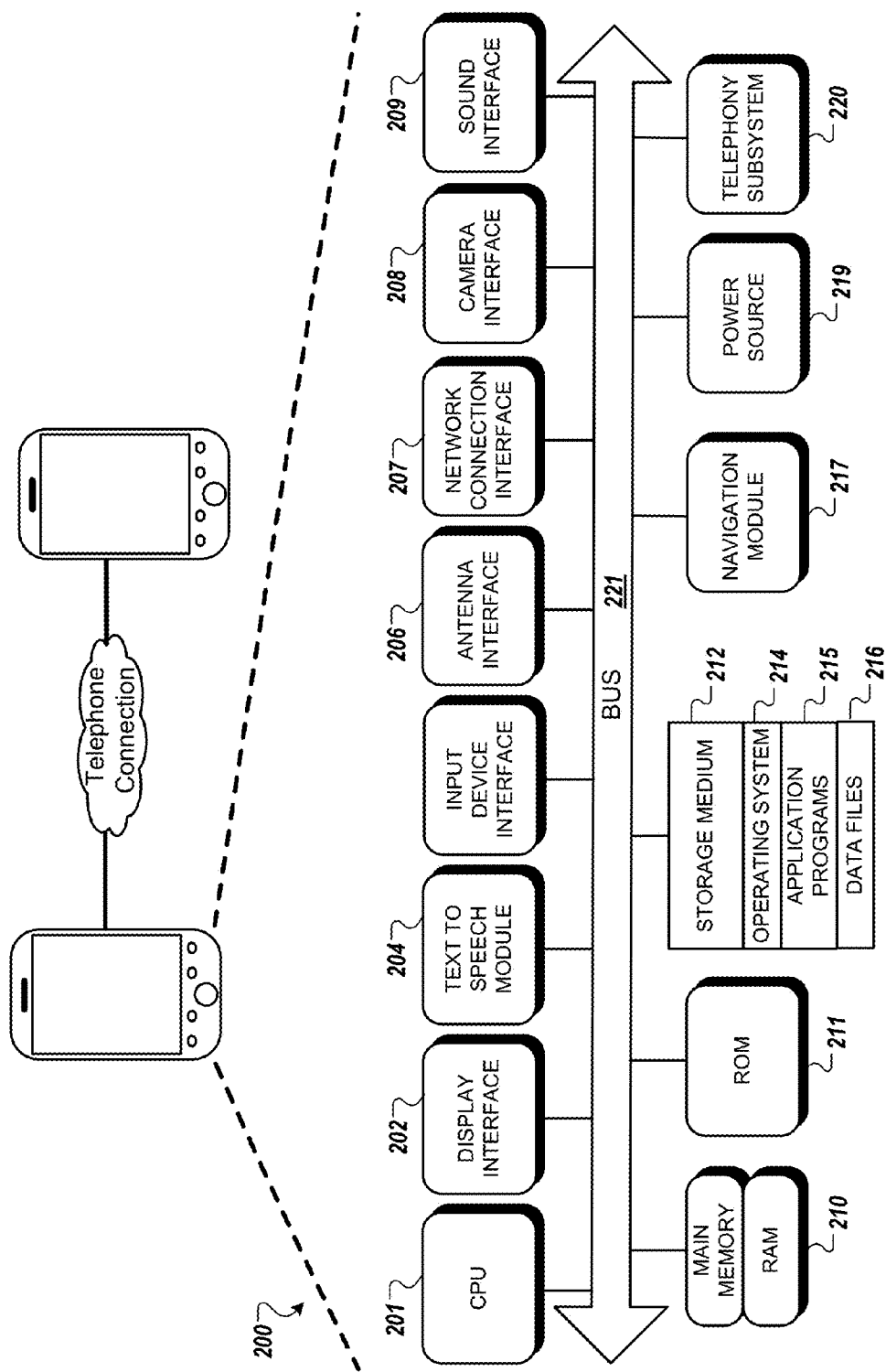
FIGS. 2 and 5 are diagrams of exemplary systems.

FIG. 2 is a block diagram illustrating an exemplary internal architecture 200 of a client device. The architecture includes a central processing unit (CPU) 201 in which the computer instructions that comprise an operating system or an application are processed; a display interface 202 that provides a communication interface, and processing functions for rendering video, graphics, images, and texts in the user interface 112, provides a set of built-in controls (such as buttons, text and lists), and supports diverse screen sizes; a TTS module 204 that translates text data into a speech signal; an input device interface 205 that provides a communication interface to a stylus, keyboard, and/or other input device(s) attached to the client device 102; an antenna interface 206 that provides a communication interface to a client device antenna; a network connection interface 207 that provides a communication interface to a network over a computer network connection (e.g., cellular, radio, satellite, etc.); a camera interface 208 that provides a communication interface and processing functions for capturing digital images from a built-in camera; a sound interface 209 that provides a communication interface for converting sound into electrical signals using the microphone and for converting electrical signals into sound using the speaker; a random access memory (RAM) 210 where computer instructions and data are stored in a volatile memory device for processing by the CPU 201; a read-only memory (ROM) 211 where invariant low-level systems code or data for basic system functions such as basic input and output (I/O), startup, or reception of keystrokes from a keyboard are stored in a non-volatile memory device; a storage medium 212 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 214, application programs 215 (including, for example, a local device information player application, a caller identification application, an address book contact information application, a widget or gadget engine, and or other applications, as necessary) and data files 216 are stored; a navigation module 217 that provides a real-world or relative position or geographic location of the client device 102; a power source 219 that provides an appropriate alternating current (AC) or direct current (DC) to power components; and a telephony subsystem 220 that allows the device 102 to transmit and receive sound over a telephone network. The constituent devices and the CPU 201 communicate with each other over a bus 221.

The CPU 201 may be one or more of any appropriate number of computer processors that make up a computer system. The computer system may be internal to the device 102 itself. In one arrangement, the computer CPU 201 includes more than one processing unit. The RAM 210 interfaces with the computer bus 221 so as to provide quick RAM storage to the CPU 201 during the execution of software programs such as the operating system 214, application programs 215, and device drivers. In one example configuration, the CPU 201 loads computer-executable process steps from the storage medium 212 or other media into a field of the RAM 210 in order to execute software programs. Data is stored in the RAM 210, where the data is accessed by the computer CPU 201 during execution.

The storage medium 212 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM). a synchronous dynamic random access memory (SDRAM), or an external micro-DIMM SDRAM. Such computer readable storage media allow the client device 102 to access computer-executable process steps, application programs and the like, stored on removable and non-removable memory media, to off-load data from the client device 102, or to upload data onto the client device 102. Data files 216 stored within the client device 102, in some examples, may include user preference settings such as locale context (e.g., country, language, time zone, and/or other location information), contact information records, stored text messages, digital images, user-generated notes or lists, and other text-based personal information.

The navigation module 217 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 217 may also be used to measure angular displacement, orientation, or velocity of the device 102, such as by using one or more accelerometers.

A computer program product is tangibly embodied in storage medium 212, a machine-readable storage medium. The computer program product includes instructions that, when read by a machine, operate to cause a data processing apparatus to translate user-selected text data into a speech signal and output the speech signal via the outgoing audio channel and/or incoming audio channel of the client device 102. In some implementations, the computer program product includes instructions that filter the text data prior to translation or generate additional speech information to be appended to the translated text data, such as a pre-recorded message or locale-specific information (e.g., international dialing information prefixed to a stored phone number).

Figure 3:
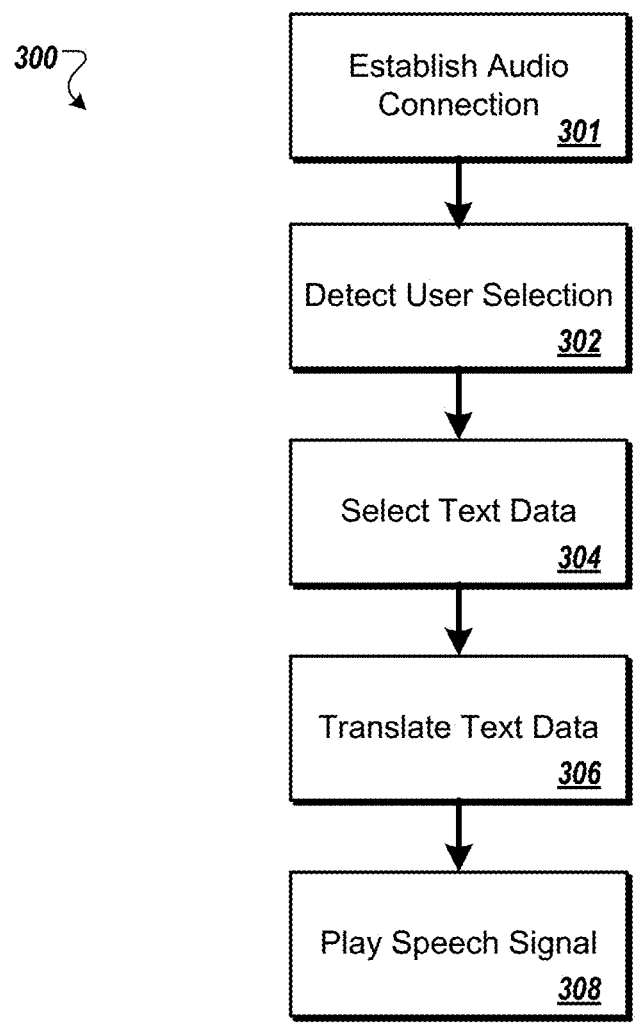
FIG. 3 is a flowchart of an exemplary process.

FIG. 3 is a flowchart of an exemplary process 300. The process 300 includes actions that may be used, for instance, to respond to a request from another party for a telephone number, with a speech signal that provides the digits of the requested telephone number to the other party of the telephone call, as described with respect to FIG. 1. The process 300 generally involves detecting that a control has been selected to activate a local device information player application that translates, into a speech signal, text data that is associated with the selection of the particular control.

In some implementations, the process 300 is invoked by a local device information player application stored within the storage medium 212 of the client device 102, as described in relation to FIG. 2. For example, the process 300 may receive information from the display interface 202 and/or the input device interface 205, manipulate the information using the TTS module 204, and output the information through the sound interface 209 and/or the telephony subsystem 220. In some implementations, the process 300 may further obtain information through other application programs 215, data files 216, the network connection interface 207 or the navigation module 217.

When the process 300 begins, an audio connection including an audio stream is established between a first client device and a remote second client device (301). The audio connection between the first client device and the remote second client device may be a direct connection, or an indirect telephone connection (e.g., through a network). Where the first client device is a mobile phone, a user of the first client device may establish the connection with the remote second client device by dialing a telephone number associated with the second client device, and hitting "send."

A user selection of a client device control is detected (302). The control may be a graphical (touch screen) control such as the "Say" control 116 displayed upon the user interface 112 of the client device 102, as described in relation to FIG. 1. In other examples, the control may be a physical button (e.g., a key on a keypad), a soft key, a software widget or gadget, a GUI menu option selected through user navigation, or option selected by a voice command.

In some implementations, other details of the selection are also determined, such as the quantity or duration of the selection. For instance, a particular control may invoke one type of functionality for a single selection or for a selection of less than a predetermined duration, and may invoke other functionality, including "Say" functionality, when selected multiple times or for a duration longer than the predetermined duration. The input device interface 205 or the display interface 202, as described in relation to FIG. 2, may aide in detection of the control selection. Other example controls are described below with respect to FIGS. 4A to 4F.

Text data is selected (304). If the user selected one of multiple controls, the selected control may be identified prior to selecting text data associated with the identified control, to select the text data which corresponds to the identified control. In one example, text displayed adjacent to the selected control may be selected.

In some implementations, the text data includes a portion of text visible within the display area of the client device. For example, the text data associated with the phone number 114 is selected when the user selects the "Say" control 116 as shown in FIG. 1. In other implementations, the text data may include data associated with selected information (e.g., selection of a contact name selects all information within the contact record) or data generated in real time by the client device (e.g., determining the current position of the device). For example, the navigation module 217 may be used to determine the present geographical location of the client device 102, as described in relation to FIG. 2. In another example, a contact information application may be invoked, whereby the application detects a contact stored in a storage medium of the client device and outputs the contact information as text data to the local device information player application. An optical character recognition (OCR) application may be performed on a digital image, in a further example, and any text located with the image used as text data. Other sources of text data are possible.

The text data is translated into a speech signal (306), for example using a TTS module. In some implementations, the text data is modified prior to translation. The text data may be filtered, for example, to remove special characters or private information. In another example, the text data may be appended to include a pre-recorded message or additional information such as a national dialing code in the case of a phone number.

In some implementations, the text data may be modified based upon the identity of the caller or the callee. For example, based upon the location of the first party 104, the phone number 114 is appended to include the international dialing code 120 and the country code 122 (as described in FIG. 1). The text data may be filtered, in another example, to remove private or classified information based upon the identity of the recipient of the information.

In some implementations, the text may be translated into one or more of multiple languages. For example, the locale setting of the client device, the identity of the caller or callee, or the geographic location of the client device could be taken into consideration to identify a target language, and a TTS module associated with the target language. In other implementations, a user setting associated with the local device information player application (e.g., as stored within the storage medium 212) may be accessed to determine a desired language for translation.

The speech signal is played over the audio stream of the client device (308), thereby ending the process 300. For example, the speech signal may be provided to the telephony subsystem 220 to output the speech signal to the other party of the telephone call. While the speech signal is transmitting over the audio stream, the microphone of the client device may be muted. In some implementations, the speech signal or a prerecorded audio message may be provided to the speaker of the client device through the input audio stream while the speech signal is being transmitted over the audio stream. The incoming audio stream from the other party of the telephone call may be muted during this time.

FIGS. 4A-4F are example client device configurations. The configurations illustrate a variety of control options and application interactions which may be used with a local device information player application to translate text into a speech signal and to transmit the speech signal. The physical layout of the exemplary client device depicted in FIGS. 4A-4F is a simplified depiction of a mobile device such as a cellular phone, smart phone, or PDA.

Figure 4A:
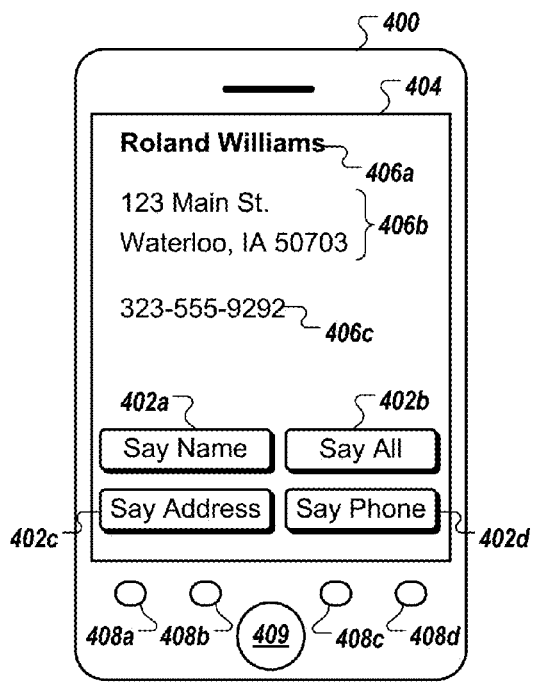
FIGS. 4A-4F are exemplary client device configurations.

As shown in FIG. 4A, a client device 400 includes a set of four GUI controls 402a-402d arranged within a display area 404 for selecting different portions of a displayed contact information record 406. When selected, a "Say Name" control 402a invokes functionality which directs the client device 400 to translate text data into a speech signal, and to output the speech signal corresponding to a name field 406a of the contact information record 406. Similarly, a "Say All" control 402b corresponds to the entire contact information record 406; a "Say Address" control 402c corresponds to an address field 406b of the contact information record 406; and a "Say Phone" control 402d corresponds to a phone number field 406c of the contact information record 406.

The GUI controls 402a-402d, in some examples, may be selected by activating each control as displayed upon a touch screen version of the display area 404, selecting a first control 408a, a second control 408b, a third control 408c, or a fourth control 408d arranged horizontally beneath the display area 404 of the client device 400, or using a navigation control 409 (e.g., track ball, multi-directional navigation control, touch-sensitive navigation key, etc.) to navigate to and select one of the GUI controls 402a-402d. In other implementations, a soft key or voice command may be used to select one of the GUI controls 402a-402d.

Figure 4B:
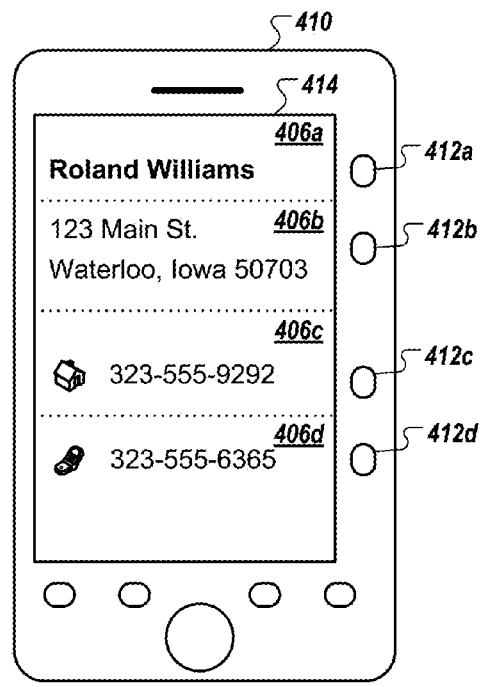

FIG. 4B illustrates a client device 410 with a set of physical buttons 412a-412d arranged vertically, to the right of a display area 414. A topmost vertical control 412a is arranged horizontally adjacent to the name field 406a of the contact information record 406. Similarly, a second vertical control 412b is aligned with the address field 406b, a third vertical control 412c is aligned with the phone number field 406c, and the fourth vertical control 412d is aligned with a client device record 406d. Selection of one of the controls 412a-412d directs the client device 410 to translate and output an audio signal corresponding to the adjacent field 406a-406d of the contact information record 406. Although the vertical controls 412a-412d are illustrated as physical buttons, in other implementations the vertical controls 412a-412d may be graphical controls (e.g., touch screen controls, softkey controls, etc.) arranged within the display area 414, adjacent to corresponding text data.

Figure 4C:
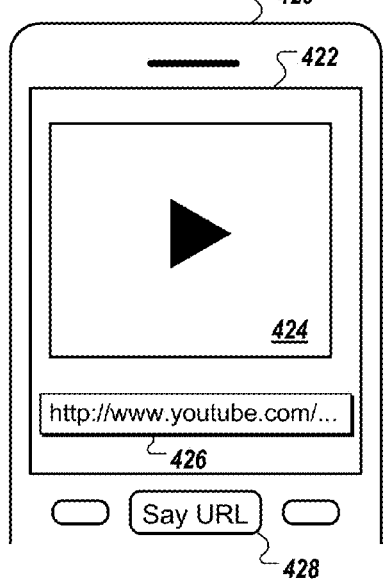

As shown in FIG. 4C, a media file 424 is rendered within a display area 422 of a client device 420. Beneath the media file 424, an address bar 426 displays a Uniform Resource Locator (URL) of the source location of the media file 424. A "Say URL" control 428 is arranged beneath the display area 422. Selection of the "Say URL" control 428 directs the client device 420 to translate the textual URL data to a speech signal, and to output the audio signal corresponding to the URL shown within the address bar 426. In other implementations, the name of the website hosting the media file 424 (e.g., "Youtube"), the name of the media file 424 (e.g., song, video, etc.), a brief synopsis of the contents of the media file 424, and/or other text data may be provided to the local device information player application upon selection of the "Say URL" control 428. Although the "Say URL" control 428 is presented as a physical button upon the client device 420, in other implementations the "Say URL" control 428 may be a graphical control located within the display area 422.

Figure 4D:
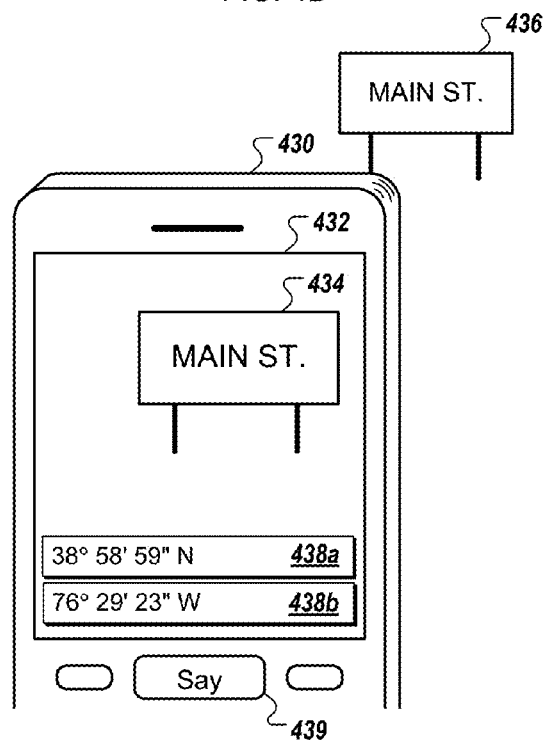

FIG. 4D shows a client device 430 including a display area 432 presenting a digital image 434 of a street sign 436. The digital image 434, for example, may have been captured by a digital camera feature of the client device 430 after the selection of a "Say" control 439. A longitudinal coordinate measurement 438a and a latitudinal coordinate measurement 438b are provided within the display area 432 beneath the digital image 434. The measurements 438a and 438b, for example, may be calculated using a GPS feature of the client device 430 such as the navigation module 217 described in relation to FIG. 2. By selecting the "Say" control 439, the client device 430 may translate the measurements 438a and 438b and, optionally, the street sign characters (e.g., through OCR of the digital image 434) into a speech signal and transmit the speech signal to the other party of the telephone call.

In some implementations, rather than using a digital camera feature to create the digital image 434, the client device 430 may retrieve an address location or a map of the immediate area based upon the measurements 438a and 438b. For example, a network mapping service may be accessed by the client device 430 through the network connection interface 208 (as described in FIG. 2) to retrieve a visual map based upon a location calculated by the navigation module 217. The address location, for example, may be translated to a speech signal which is transmitted to the other party of a telephone call.

Figure 4E:
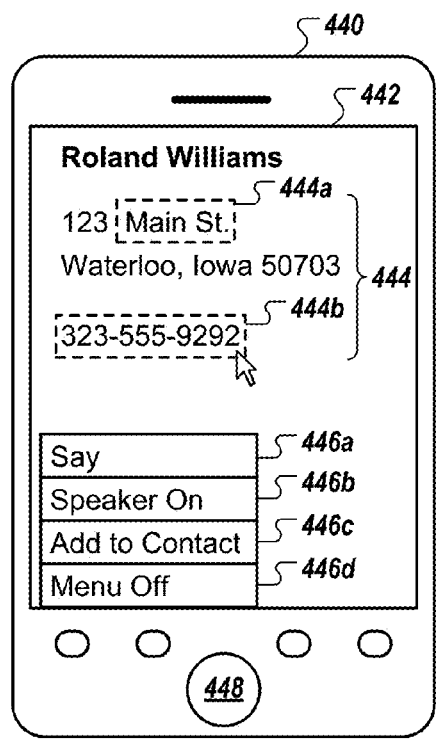

As illustrated in FIG. 4E, a client device 440 includes a display area 442 depicting a contact information record 444 and a GUI menu control 446 for manipulating the contact information record 444. A street name 444a and a phone number 444b are highlighted or selected within the contact information record 444. In some examples, the street name 444a and the phone number 444b may be selected using a finger or selection tool (e.g., stylus) within a touch screen display area 442 or by navigating using physical buttons available upon the client device 440 such as a navigation control 448.

The GUI menu 446 includes the following options: a "Say" control 446a which may be selected to translate the street name 444a and phone number 444b into a speech signal and transmit from the client device 440; a "Speaker On" control 446b which may be selected to activate the loudspeaker feature of the client device 440; an "Add to Contact" control 446c which may be selected to add new information to the contact information record 444; and a "Menu Off" control 446d which may be selected to close the GUI menu 446. Although the GUI menu 446 includes a selection specific to the contact information application, in other implementations, the "Say" control may correspond to a menu selection within an application-generic GUI menu such as a client device system menu.

Figure 4F:
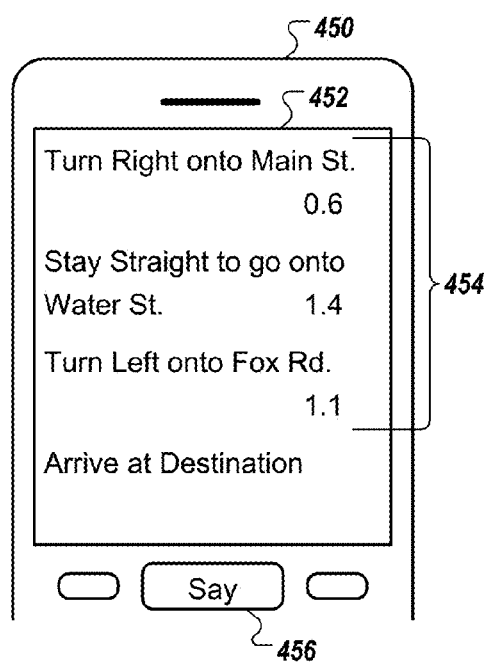

FIG. 4F illustrates a client device 450 displaying a set of driving directions 454 within a display area 452. Upon selection of a "Say" control 456, the client device 450 may translate the driving directions 454 into a speech signal and transmit the speech signal to the other party of the telephone call. In some implementations, the driving directions 454 may be pre-processed before being translated into a speech signal. For example, the abbreviations "St." and "Rd." may be expanded to "street" and "road". The distances, in another example, may each be appended with the word "miles".

The speech signal, in some implementations, may be output through the loudspeaker to a user based upon the current location of the user. For example, the client device 450 may behave like a handheld navigation device by combining a GPS feature of the client device 450 with the local device information player application, providing turn-by-turn instructions during travel. In other implementations, selection of the "Say" control 456 may supply the driving directions a single line at a time. For example, upon the first selection of the "Say" control 456, the client device 450 outputs "Turn Right onto Main Street, proceed point six miles". After proceeding on Main Street, the user may again press the "Say" control 456 to receive the instruction "Stay Straight to go onto Water Street, proceed one point four miles" and so on. In this manner, the client device 450 could be used as a demand-based navigational coach without involving a GPS feature.

Figure 5:
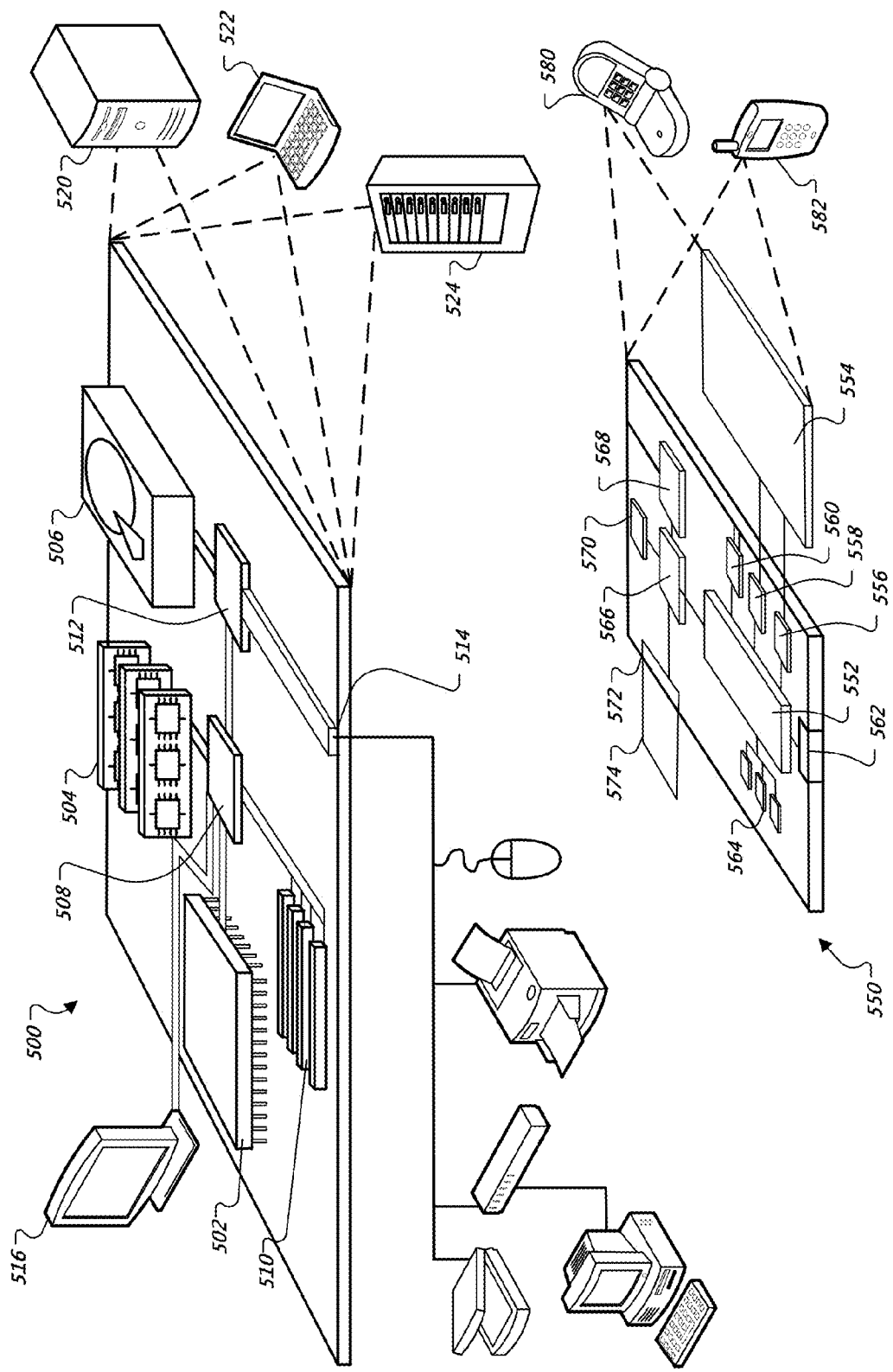

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for playing local device information over a telephone connection may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
while an audio connection remains established between a first electronic client communication device and a remote, second electronic client communication device, receiving one or more user inputs that indicate that selected text data that was stored on the first electronic client communication device before the audio connection was established is to be synthesized into a speech signal and played over the audio connection;
identifying a geographic locale associated with the first electronic client communication device;
modifying the text data based on the geographic locale; and
in response to receiving the one or more user inputs, muting a microphone of the first electronic client communication device, synthesizing the modified text data into speech, and playing the speech signal to the remote second electronic client device over the audio connection.

2. The method of claim 1, further comprising:
identifying a user selected control from among multiple controls on the first electronic client communication device, the identified control corresponding to one of the one or more user inputs; and
selecting text data that is associated with the identified control.

3. The method of claim 2, wherein the control comprises a physical button, a software widget, a soft key, or a menu option.

4. The method of claim 2, further comprising:
selecting text displayed adjacent to the user selected control on a user interface of the first electronic client communication device.

5. The method of claim 1, wherein modifying the text data comprises appending the text data or filtering the text data.

6. The method of claim 1, wherein modifying the text data comprises appending a calling code to the text data.

7. The method of claim 1, further comprising:
invoking a contact application on the first electronic client communication device;
identifying a contact stored in a storage medium of the first electronic client communication device, using the contact application; and
outputting contact information for the identified contact as the text data.

8. The method of claim 1, further comprising:
muting the audio connection and playing a prerecorded audio message over a speaker of the first electronic client communication device while playing the speech signal over the audio connection.

9. The method of claim 1, wherein the audio connection between the first electronic client communication device and the remote, second electronic client communication device comprises an indirect telephone connection through a network.

10. The method of claim 1, wherein the one or more user inputs select the text data that was stored on the first electronic client communication device before the audio connection was established.

11. A computer-implemented method comprising:
while an audio connection remains established between a first electronic client communication device and a remote, second electronic client communication device, receiving one or more user inputs that indicate that selected text data that was stored on the first electronic client communication device before the audio connection was established is to be synthesized into a speech signal and played over the audio connection;
determining an identity of a caller or a callee corresponding to the first electronic client communication device;
modifying the text data based on the identity of the caller or the callee; and
in response to receiving the one or more user inputs, muting a microphone of the first electronic client communication device, synthesizing the text data into speech, and playing the speech signal to the remote second electronic client device over the audio connection.

12. The method of claim 11, further comprising:
identifying a user selected control from among multiple controls on the first electronic client communication device, the identified control corresponding to one of the one or more user inputs; and
selecting text data that is associated with the identified control.

13. The method of claim 11, wherein modifying the text data comprises appending the text data or filtering the text data.

14. The method of claim 11, wherein modifying the text data comprises appending a calling code to the text data.

15. The method of claim 11, further comprising:
invoking a contact application on the first electronic client communication device;
identifying a contact stored in a storage medium of the first electronic client communication device, using the contact application; and
outputting contact information for the identified contact as the text data.

16. The method of claim 11, further comprising:
muting the audio connection and playing a prerecorded audio message over a speaker of the first electronic client communication device while playing the speech signal over the audio connection.

17. The method of claim 11, wherein the audio connection between the first electronic client communication device and the remote, second electronic client communication device comprises an indirect telephone connection through a network.

18. The method of claim 11, wherein the one or more user inputs select the text data that was stored on the first electronic client communication device before the audio connection was established.

19. A non-transitory computer storage medium encoded with a computer program, the program comprising instructions that when executed by data processing apparatus cause the data processing apparatus to perform operations comprising:
while an audio connection remains established between a first electronic client communication device and a remote, second electronic client communication device, receiving one or more user inputs that indicate that selected text data that was stored on the first electronic client communication device before the audio connection was established is to be synthesized into a speech signal and played over the audio connection;
identifying a geographic locale associated with the first electronic client communication device;
modifying the text data based on the geographic locale; and
in response to receiving the one or more user inputs, muting a microphone of the first electronic client communication device, synthesizing the modified text data into speech, and playing the speech signal to the remote second electronic client device over the audio connection.

20. A non-transitory computer storage medium encoded with a computer program, the program comprising instructions that when executed by data processing apparatus cause the data processing apparatus to perform operations comprising:
while an audio connection remains established between a first electronic client communication device and a remote, second electronic client communication device, receiving one or more user inputs that indicate that selected text data that was stored on the first electronic client communication device before the audio connection was established is to be synthesized into a speech signal and played over the audio connection;
determining an identity of a caller or a callee corresponding to the first electronic client communication device;
modifying the text data based on the identity of the caller or the callee; and
in response to receiving the one or more user inputs, muting a microphone of the first electronic client communication device, synthesizing the text data into speech, and playing the speech signal to the remote second electronic client device over the audio connection.

* * * * *